United States Patent
Su et al.

(10) Patent No.: US 8,261,105 B2
(45) Date of Patent: Sep. 4, 2012

(54) SWITCHING POWER CIRCUIT AND COMPUTER SYSTEM

(75) Inventors: Sheng-Chieh Su, Taipei (TW); Jung-Tai Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 362 days.

(21) Appl. No.: 12/631,053

(22) Filed: Dec. 4, 2009

(65) Prior Publication Data

US 2010/0162010 A1   Jun. 24, 2010

(30) Foreign Application Priority Data

Dec. 22, 2008   (TW) ................. 97150127 A

(51) Int. Cl.
G06F 1/00 (2006.01)
G05F 1/00 (2006.01)
H03K 17/00 (2006.01)

(52) U.S. Cl. ...................... 713/300; 327/375
(58) Field of Classification Search .......... 713/300; 327/375
See application file for complete search history.

(56) References Cited

U.S. PATENT DOCUMENTS

| | | | | |
|---|---|---|---|---|
| 4,356,416 A | * | 10/1982 | Weischedel | 327/375 |
| 5,077,651 A | * | 12/1991 | Kobayashi et al. | 363/56.05 |
| 5,615,094 A | | 3/1997 | Cosentino et al. | |
| 6,043,636 A | * | 3/2000 | Gaudreau et al. | 323/282 |
| 2006/0152877 A1 | * | 7/2006 | Buzzard et al. | 361/118 |

FOREIGN PATENT DOCUMENTS

| | | |
|---|---|---|
| CN | 1812237 A | 8/2006 |
| CN | 101267112 A | 9/2008 |

OTHER PUBLICATIONS

Non-Patent Literature:"Tutorial 848—Snubber Circuits Suppress Voltage Transient Spikes in Multiple Output DC-DC Flyback Converter Power Supplies." <http://maxim-ic.com/app-notes/index.mvp/id/848>. Maxim Integrated Products. Accessed Jan. 25, 2012.*

* cited by examiner

*Primary Examiner* — Thomas Lee
*Assistant Examiner* — Terrell Johnson
(74) *Attorney, Agent, or Firm* — Jianq Chyun IP Office

(57) ABSTRACT

The invention relates to a switching power circuit connected to a motherboard of a computer system. The switching power circuit includes a PWM circuit and a snubber circuit. The PWM circuit includes a phase terminal, and it may output an output voltage to the motherboard via the phase terminal. The snubber circuit includes a zener diode. A negative terminal of the zener diode is connected to the phase terminal, and a positive terminal is connected to the ground terminal. The level of a breakdown voltage of the zener diode is equal to the level of the output voltage in a steady state.

12 Claims, 3 Drawing Sheets

SWITCHING POWER CIRCUIT AND COMPUTER SYSTEM

FIELD OF THE INVENTION

The invention relates to a switching power circuit and a computer system and, more particularly, to a switching power circuit used in a computer system and having power-saving effect.

BACKGROUND OF THE INVENTION

Generally, in a computer system, power for a central processing unit (CPU) is not directly provided by a power supply, mainly because the core current (Icore) needed by the CPU is changed according to the load of the CPU. Thus, the core current (Icore) needed by the CPU may increase or decrease instantly, and the power supply cannot give such quick response. To solve the problem, a switching power circuit for supplying power to the CPU is disposed on a motherboard.

FIG. 1 is a schematic diagram showing the switching power circuit on the motherboard of a conventional computer. As shown in FIG. 1, the switching power circuit mainly includes a pulse width modulation (PWM) control unit 10, a PWM driving unit 12 and a PWM circuit 14.

The PWM control unit 10 may output a PWM signal to the PWM driving unit 12.

The PWM driving unit 12 may generate a first driving signal S1 and a second driving signal S2 according to the PWM signal.

In addition, the PWM circuit 14 includes a high side MOS M1, a low side MOS M2, an output inductance Lo and an output capacitor Co. A drain (D) of the high side MOS M1 is connected to a power voltage (Vcc), the gate (G) of the high side MOS M1 receives the first driving signal S1, a source (S) of the high side MOS M1 is connected to a first terminal of the output inductance Lo. A drain (D) of the low side MOS M2 is connected to the first terminal of the output inductance Lo, and a gate (G) of the low side MOS receives the second driving signal S2. A source (S) of the low side MOS M1 is connected to the ground terminal (GND).

The source (S) of the high side MOS M1 and the drain (D) of the low side MOS M2 may be considered as a phase terminal (P) of the switching power circuit.

A second terminal of the output inductance Lo is an output terminal of the core current (Icore). The output capacitor Co is connected between the output terminal of the core current (Icore) and the ground terminal (GND).

The output terminal of the core current (Icore) may be connected to a power layer (not shown) of the motherboard. The power layer is connected to the CPU to provide the core current (Icore) to the CPU. In addition, the high side MOS M1 and the low side MOS M2 are N-MOSFETs, and the power voltage (Vcc) is 19 volts.

The main function of the switching power circuit is to give an instant response and provide steady core current (Icore) to the motherboard according to the voltage level requirement sent by the CPU. These are achieved by the detection of the voltage identification digital (VID) signal of the CPU, and the VID signal has relation to the actual load of the CPU. When the VID signal is detected, the PWM control unit 10 outputs the PWM signal according to the detected VID signal. The PWM driving unit 12 then outputs the first driving signal S1 and the second driving signal S2 according to the received PWM signal. The first driving signal S1 and the second driving signal S2 may control the high side MOS M1 and the low side MOS M2 to be conducted (ON) or blocked (OFF), respectively. Only one of the high side MOS and the low side MOS is conducted (ON) at the same time.

For example, when the PWM control unit 10 knows that the CPU is in a heavy load condition according to the detected VID signal, it outputs the PWM signal to make the PWM driving unit 12 output a first driving signal S1 to prolong the conducting time of the high side MOS M1. That is, the PWM driving unit 12 outputs a second driving signal S2 to prolong the blocking time of the low side MOS M2. The phase terminal (P) of the switching power circuit may output core current (Icore) with larger value via the power voltage (Vcc) to the output terminal of the core current (Icore) to improve the processing efficiency of the CPU. On the contrary, when the PWM control unit 10 knows the CPU is in a light load condition according to the detected VID signal, the output PWM signal may make the PWM driving unit 12 output the first driving signal S1 to prolong the blocking time of the high side MOS M1. That is, the PWM driving unit 12 outputs a second driving signal S2 to prolong the conducting time of the low side MOS M2. The phase terminal (P) of the switching power circuit may output core current (Icore) with lower value via the power voltage (Vcc) to the output terminal of the core current (Icore) to reduce the power consumed by the CPU. The output inductance Lo is used as a power storing and rectifying component, and it may store excessive power temporarily when the current is large or release power when the current is not enough to make the current steady. The output capacitor Co is used as an electric power storing and wave filtering component, and it is not only able to exclude low frequency noises, but also able to store current to provide steady power to the CPU.

Since the peripheral components on the motherboard may generate parasitic inductance, when the high side MOS M1 is conducted (ON) instantly, the high side MOS M1 may generate instant current with a larger value. Furthermore, since the voltage generated by the parasitic inductance is Vp1=L*di/dt, the Vp1 increases instantly, and a voltage spike is generated. Wherein, the Vp1 is the spike voltage generated by the parasitic inductance, L is the inductance value of the parasitic inductance, and i is the value of the current passing through the parasitic inductance. The excessive spike voltage may damage the power components of the switching power circuit.

FIG. 2 is a schematic diagram, showing the output voltage of the phase terminal (P) of the switching power circuit.

As shown in FIG. 2, at the time point t1, the high side MOS M1 is conducted (ON) instantly. At that moment, the phase terminal (P) begins to output voltage (Vlow, the output voltage of the phase terminal (P) before the high side MOS is conducted).

At the time segment between t1 and t2, the output voltage of the phase terminal (P) increases continuously.

At the time point t2, a spike is generated.

At the time point t3, the spike reaches the maximum value (Vspike-max).

At the time point t3 to t4, the spike decreases continuously.

At the time point t4, the spike disappears. The output voltage of the phase terminal (P) of the switching power circuit reaches steady-state voltage (Vhigh, the output voltage of the phase terminal (P) in a steady state after the high side MOS M1 is conducted).

To prevent the excessive spike voltage (or spike current) from damaging the power components of the switching power circuit, a snubber circuit is usually used. FIG. 3 is a schematic diagram showing a conventional switching power circuit. As shown in FIG. 3, the difference between FIG. 1 and FIG. 3 is that the phase terminal (P) of the switching power circuit in FIG. 3 is connected to a snubber circuit 16 in a parallel connecting mode. The snubber circuit 16 further includes a resistor (Rs) and a capacitor (Cs). A first terminal of the resistor (Rs) is connected to the phase terminal (P), and a second terminal of the resistor (Rs) is connected to a first terminal of the capacitor (Cs). A second terminal of the capacitor (Cs) is connected to the ground terminal.

When the high side MOS M1 is conducted (ON) and the low side MOS M2 is blocked (OFF), the voltage (Vds) of the phase terminal (P) begins to increase. An input current (Iinput) generated by the power voltage (Vcc) may charge the capacitor (Cs) via the resistor (Rs). When the high side MOS M1 is blocked (OFF) and the low side MOS M2 is conducted (ON), power stored in the capacitor (Cs) is discharged via the low side MOS M2 and the resistor (Rs). Since the snubber circuit 16 may consume part of the spike power, power consumed in the power components is reduced. Thus, the objective of protecting is achieved. The charging and discharging time of the snubber circuit 16 depend on the value of the resistor (Rs) and the value of the capacitor (Cs). Generally, the value of the resistor (Rs) is dozens of to hundreds of ohms, and the value of the capacitor (Cs) is hundreds of pFs to dozens of nFs.

As shown in FIG. 2, since the conventional snubber circuit 16 is not only able to absorb power generated by the spike (at the time segment between t2 and t4), it is also able to absorb power generated before the spike is generated and after the phase terminal (P) begins to output voltage (at the time segment between t1 and t2). It wastes power.

SUMMARY OF THE INVENTION

The invention relates to a switching power circuit connected to a motherboard of a computer system. The switching power circuit includes a PWM circuit and a snubber circuit. The PWM circuit includes a phase terminal, and it may output an output voltage to the motherboard via the phase terminal. The snubber circuit includes a zener diode. A negative terminal of the zener diode is connected to the phase terminal, and a positive terminal is connected to a ground terminal. The level of a breakdown voltage of the zener diode is equal to that of the output voltage in a steady state.

The invention also provides a computer system including a motherboard, a PWM circuit and a snubber circuit. The PWM circuit includes a phase terminal, and the PWM circuit may output an output voltage to the motherboard via the phase terminal. The snubber circuit further includes a zener diode. A negative terminal of the zener diode is connected to a first terminal of the output inductance, and a positive terminal is connected to the ground terminal.

BRIEF DESCRIPTION OF THE DRAWINGS

These and other features, aspects and advantages of the present invention will become better understood with regard to the following description, appended claims, and accompanying drawings.

DETAILED DESCRIPTION OF THE PREFERRED EMBODIMENT

The invention relates to a switching power circuit having power-saving effect. The power-saving effect is mainly achieved by a snubber circuit using a zener diode.

Figure 1:
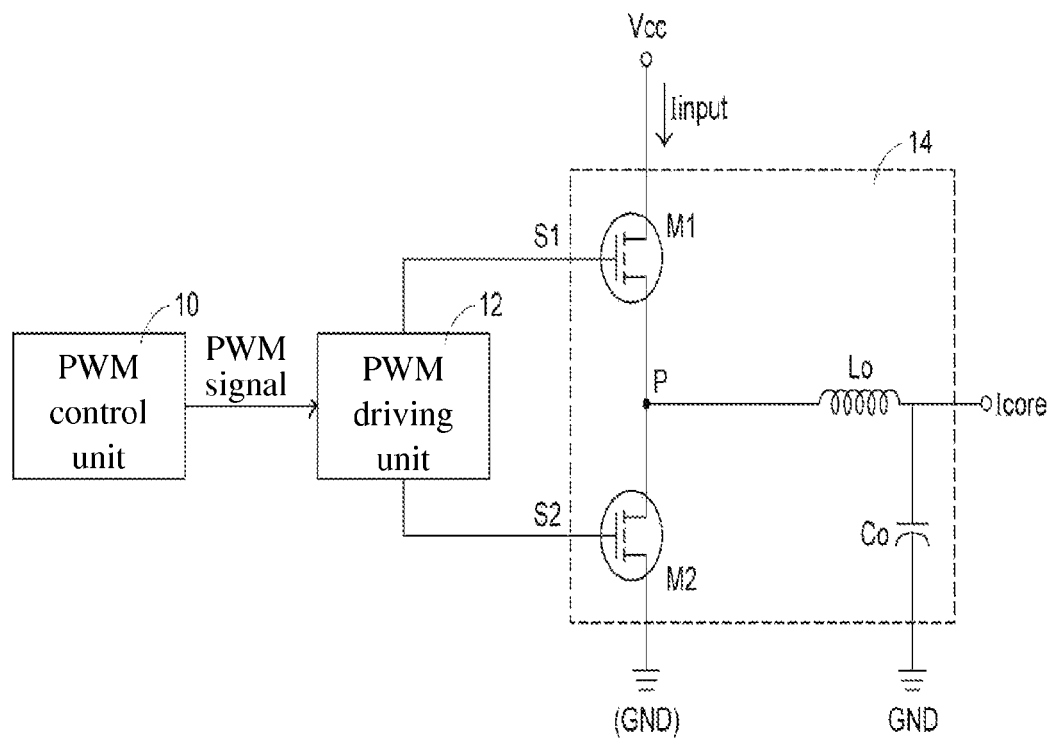
FIG. 1 is a schematic diagram showing the switching power circuit on the motherboard of a conventional computer.
Figure 2:
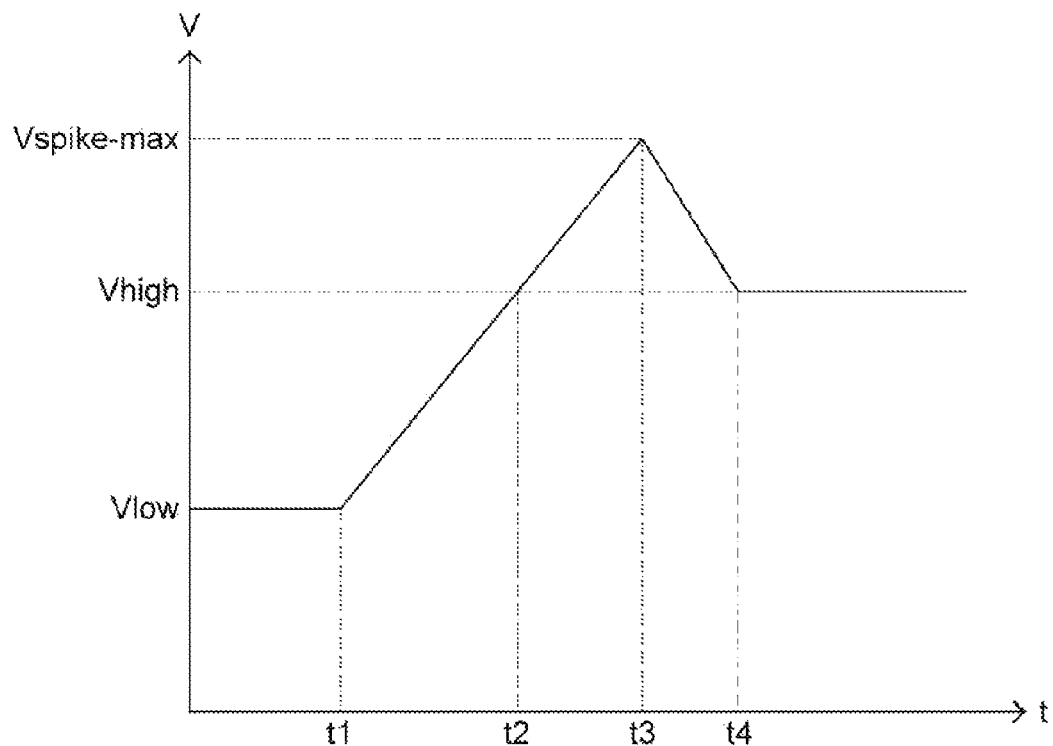
FIG. 2 is a schematic diagram showing the output voltage of the phase terminal of the switching power circuit.
Figure 3:
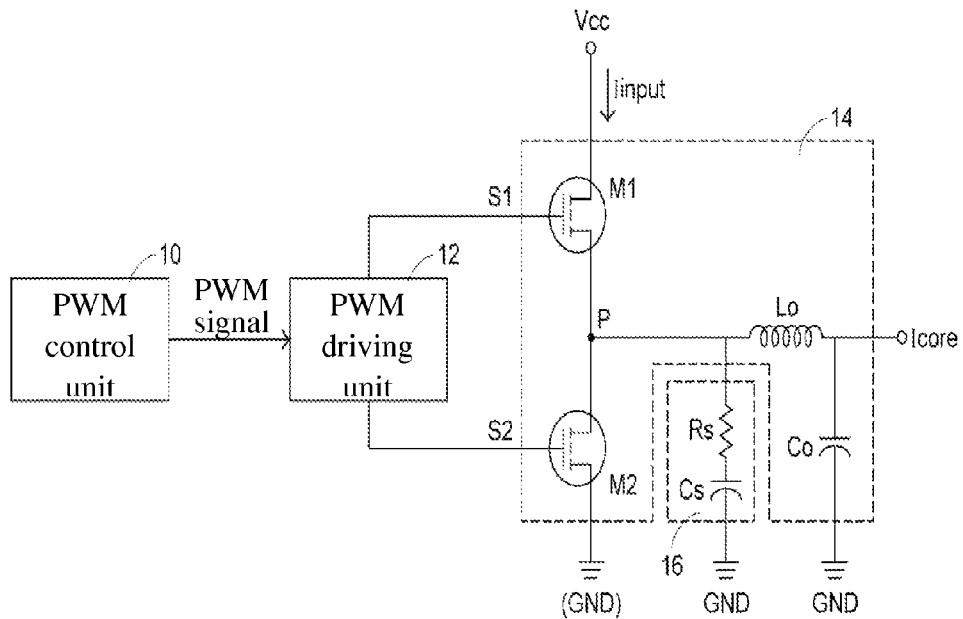
FIG. 3 is a schematic diagram showing the conventional switching power circuit.
Figure 4A:
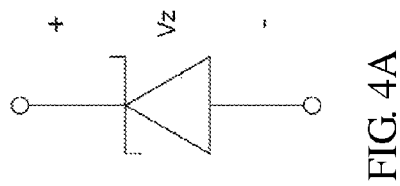
FIG. 4A is a schematic diagram showing the circuit symbol of the zener diode.

FIG. 4A is a schematic diagram showing the circuit symbol of the zener diode. As shown in FIG. 4A, the difference between the zener diode and other diodes is that the zener diode mainly works in a reverse bias breakdown area and has a breakdown voltage. When a reverse bias voltage (Vz) is lower than the breakdown voltage of the zener diode, the zener diode is blocked (OFF). When the reverse bias voltage reaches the breakdown voltage, the zener diode breaks down and is conducted (ON). At that moment, a voltage drop of the breakdown voltage of the zener diode also may exist. Even if the voltage increases continuously, the voltage drop still exists across the two terminals, and the diode is not damaged.

Figure 4B:
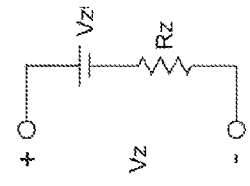
FIG. 4B is a schematic diagram showing the equivalent circuit of the zener diode.

FIG. 4B is a schematic diagram showing an equivalent circuit of the zener diode. As shown in FIG. 4B, the Vzo is the breakdown voltage (Vzo) of the zener diode, and the Rz is the inner resistor of the zener diode. Firstly, when the reverse bias voltage (Vz) is lower than the breakdown voltage (Vzo) of the zener diode, the zener diode is blocked (OFF). When the reverse bias voltage (Vz) is equal to or higher than the breakdown voltage (Vzo), the zener diode breaks down and works in a reverse bias breakdown area. Thus, the zener diode is conducted (ON). At that moment, the voltage drop of the breakdown voltage (Vzo) of the zener diode still exists.

Figure 5:
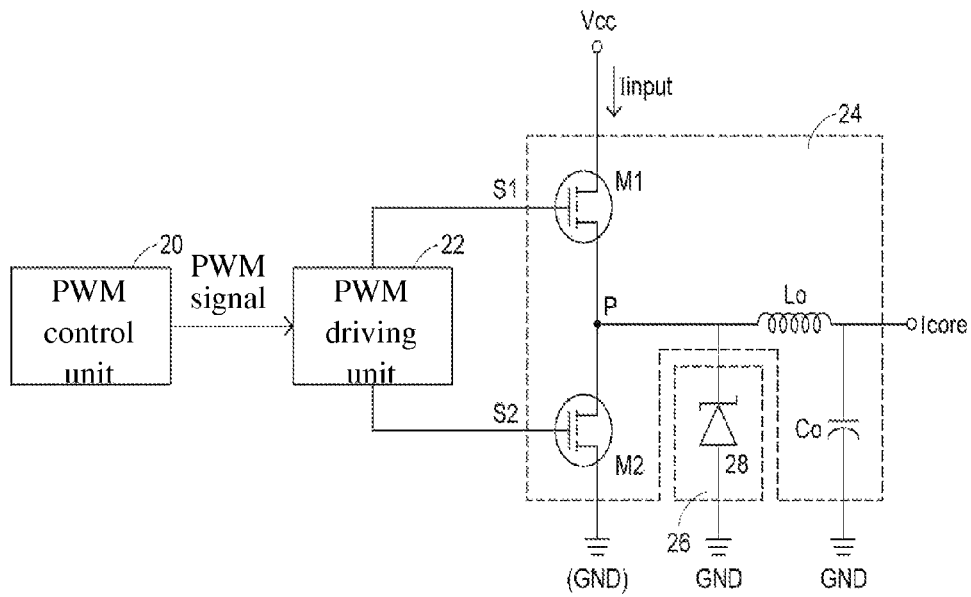
FIG. 5 is a schematic diagram showing the switching power circuit according to an embodiment of the invention.

FIG. 5 is a schematic diagram showing the switching power circuit according to an embodiment of the invention. The switching power circuit mainly includes a PWM control unit 20, a PWM driving unit 22, a PWM circuit 24 and a snubber circuit 26. The PWM control unit 20, the functions of the PWM driving unit 22 and the PWM circuit 24 are the same with the above PWM control unit 10, the PWM driving unit 12 and the PWM circuit 14, and they are not illustrated again for concise purpose.

The snubber circuit 26 may be achieved by a zener diode 28. A negative terminal of the zener diode 28 is connected to a phase terminal (P), and a positive terminal of the zener diode 28 is connected to the ground terminal.

Figure 6:
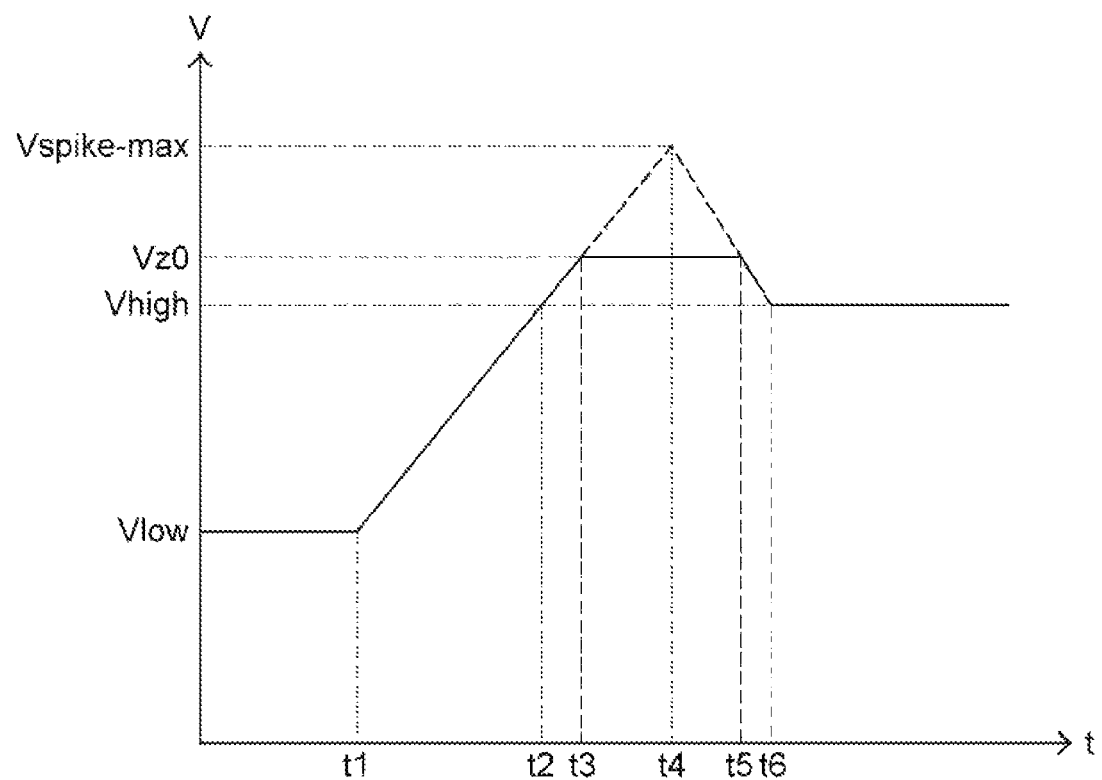
FIG. 6 is a schematic diagram showing the output voltage of the phase terminal of the switching power circuit according to an embodiment of the invention.

In addition, the output voltage of the phase terminal (P) of the switching power circuit in the invention and the switching power circuit in an embodiment of the invention in FIG. 5 are used to illustrate the principle of work of the switching power circuit in the invention. FIG. 6 is a schematic diagram showing the output voltage of the phase terminal (P) of the switching power circuit according to an embodiment of the invention. As shown in FIG. 6, the Vlow is the output voltage of the phase terminal (P) before a high side MOS M1 is conducted, and the Vhigh is the output voltage of the phase terminal (P) in a steady state after the high side MOS M1 is conducted. The Vzo is the breakdown voltage of the zener diode 28. The level of the breakdown voltage (Vzo) of the zener diode may be higher or equal to the level of the Vhigh.

At the time point t1, the high side MOS M1 is conducted instantly (ON). At that moment the phase terminal (P) begins to output voltage.

At the time segment between t1 and t2, the output voltage of the phase terminal (P) increases continuously. Since the output voltage of the phase terminal (P) is lower than the breakdown voltage (Vzo) of the zener diode 28, the zener diode 28 cannot be conducted. At that moment, the output voltage of the phase terminal (P) is outputted to the output inductance (Lo) and provided to the motherboard.

At the time point t2, a spike is generated.

At the time segment between t2 and t3, the spike increases continuously. Since the spike voltage is still lower than the breakdown voltage (Vzo) of the zener diode 28, the zener diode 28 still cannot be conducted, and the spike voltage cannot be short-circuited to the ground terminal via the blocked (OFF) zener diode 28.

At the time point t3, the spike voltage reaches the breakdown voltage (Vzo) of the zener diode, and the zener diode 28 is conducted (ON) instantly.

At the time segment between t3 to t5, the spike voltage is higher than the breakdown voltage (Vzo), and the spike voltage may be short-circuited to the ground terminal via the conducted (ON) zener diode 28. Thus, the output voltage of the phase terminal (P) keeps at the breakdown voltage (Vzo).

At the time point t4, the spike voltage achieves a maximum value (Vspike-max), and the zener diode 28 has a maximum breakdown current.

At the time point t5, the spike voltage decreases to the breakdown voltage (Vzo) of the zener diode 28, and the zener diode 28 is blocked (OFF) instantly.

At the time segment between t5 and t6, the spike voltage decreases continuously. Since the zener diode 28 is blocked (OFF), and the spike voltage is lower than the breakdown voltage (Vzo) of the zener diode 28, the spike voltage cannot be short-circuited to the ground terminal via the blocked (OFF) zener diode 28.

At the time point t6, the spike disappears. The output voltage of the phase terminal (P) reaches a steady-state output voltage, and it is outputted to the output inductance (Lo) and provided to the motherboard.

Compared with the conventional snubber circuit, before the zener diode 28 of the snubber circuit 26 in the invention is conducted, the output voltage of the phase terminal (P) (at the time segment between t1 and t3) is not short-circuited to the ground terminal by the snubber circuit 26. The output voltage of the phase terminal (P) also may be outputted to the output inductance (Lo) and provided to the motherboard. Thus, the power-saving effect is achieved.

In addition, before the zener diode 28 is conducted (ON) (at the time segment between t2 and t3), or after the zener diode 28 is blocked (OFF) (at the time segment between t5 and t6), even if part of the spike voltage cannot be short-circuited to the ground terminal via the snubber circuit 26, a zener diode 28 with proper breakdown voltage (Vzo) also may be chosen to make the breakdown voltage (Vzo) equal to the steady-state voltage (Vhigh) outputted by the phase terminal (P) after the high side MOS is conducted. Thus, the spike voltage generated at the time segment between t2 and t3 and the time segment between t5 and t6 may be avoided.

The snubber circuit achieved by the zener diode is not only able to absorb the spike generated when the high side MOS is conducted (ON) instantly, but also able to reduce the power loss. In addition, since the switching power circuit can be conducted and blocked for 100 thousands times in a second, it may save much power.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A switching power circuit connected to a motherboard of a computer system, comprising:
   a pulse width modulation (PWM) circuit including a phase terminal, wherein the PWM circuit outputs an output voltage to the motherboard via the phase terminal, the PWM circuit further comprising:
   a first MOS; and
   a second MOS,
   wherein a drain of the first MOS is connected to a power voltage, a source of the second MOS is connected to the ground terminal, a source of the first MOS and a drain of the second MOS are connected to the phase terminal, and the value of the output voltage outputted by the phase terminal is controlled by the length of conducting time or blocking time of the first MOS and the second MOS; and
   a snubber circuit including a zener diode, wherein a negative terminal of the zener diode is connected to the phase terminal, a positive terminal is connected to a ground terminal, and the level of the breakdown voltage of the zener diode is equal to the level of output voltage in a steady state.

2. The switching power circuit according to claim 1, further comprising:
   a PWM control unit which outputs a PWM signal according to an actual load of the motherboard; and
   a PWM driving unit connected between the PWM control unit and the PWM circuit, wherein the PWM driving unit outputs a first driving signal and a second driving signal to gates of the first MOS and the second MOS, respectively, according to the received PWM signal to control the first MOS and the second MOS to be conducted or blocked, respectively.

3. The switching power circuit according to claim 1, wherein the first MOS and the second MOS are N-MOSFETs.

4. The switching power circuit according to claim 1, wherein the power voltage is 19 volts.

5. The switching power circuit according to claim 1, wherein only one of the first MOS and the second MOS is conducted at the same time.

6. The switching power circuit according to claim 1, wherein when the first MOS is conducted and the second MOS is blocked, the output voltage is a steady-state voltage outputted by the phase terminal.

7. The switching power circuit according to claim 1, wherein the PWM circuit further comprises an output inductance and an output capacitor, a first terminal of the output inductance is connected to the phase terminal, a second terminal of the output inductance is connected to the motherboard, a first terminal of the output capacitor is connected to a second terminal of the output inductance and the motherboard, and a second terminal of the output capacitor is connected to the ground terminal.

8. A computer system, comprising:
   a motherboard;
   a PWM circuit including a phase terminal, wherein the PWM circuit outputs an output voltage to the motherboard via the phase terminal, the PWM circuit further comprising:
   a first MOS;
   a second MOS;
   an output inductance; and an output capacitor,
wherein a drain of the first MOS is connected to a power voltage, a source of the first MOS is connected to a drain of the second MOS, a source of the second MOS is connected to a ground terminal, the source of the first MOS and the drain of the second MOS are connected to a first terminal of the output inductance, a second terminal of the output inductance is connected to the motherboard, a first terminal of the output capacitor is connected to the second terminal of the output inductance and the motherboard, and a second terminal of the output capacitor is connected to the ground terminal; and
a snubber circuit further including a zener diode, wherein a negative terminal of the zener diode is connected to the phase terminal, a positive terminal of the zener diode is connected to a ground terminal, and when the first MOS is conducted and the second MOS is blocked, the breakdown voltage of the zener diode is equal to the output voltage of the source of the first MOS and the drain of the second MOS.

9. The switching power circuit according to claim 8, further comprising:
   a PWM control unit which outputs a PWM signal according to an actual load of the motherboard; and
   a PWM driving unit connected between the PWM control unit and the PWM circuit, wherein the PWM driving unit outputs a first driving signal and a second driving signal to gates of the first MOS and the second MOS, respectively, according to the received PWM signal to control the first MOS and the second MOS to be conducted or blocked, respectively.

10. The switching power circuit according to claim 8, wherein the first MOS and the second MOS are N-MOSFETs.

11. The switching power circuit according to claim 8, wherein the power voltage is 19 volts.

12. The switching power circuit according to claim 8, wherein only one of the first MOS and the second MOS is conducted at the same time.

* * * * *